Patented Mar. 19, 1929.

1,705,494

UNITED STATES PATENT OFFICE.

EMIL E. NOVOTNY, OF LOGAN, AND CHARLES J. ROMIEUX, OF WEST PHILADELPHIA, PENNSYLVANIA, ASSIGNORS TO JOHN STOGDELL STOKES, OF HUNTINGDON VALLEY P. O., PENNSYLVANIA.

CONDENSATION PRODUCT OF PHENOLS AND POLYHYDRIC ALCOHOLS.

No Drawing. Application filed October 15, 1923. Serial No. 668,762.

This invention relates to the manufacture of condensation products of phenols and polyhydric alcohols such as are useful in the manufacture of plastics of the potentially reactive type. These plastics, when subjected to a proper degree of heat, or the combined action of heat and pressure, are convertible to resinous solids of the infusible, insoluble type. Moreover, in the final operation of forming and reacting the products, no free acids or salts are present such as would have a detrimental effect on the steel molds and dies ordinarily used for this purpose.

Our object is the production of phenolic condensation products from suitable polyhydric alcohols such as glycerols, glycols and the higher aldols which may be readily and quickly converted through the intermediary of an accelerating or hardening agent into bodies of the hard, infusible type through the action of heat or heat and pressure.

The following illustrative examples will give a clear understanding of how these various substances react with phenol and thereby produce intermediate bodies useful for our purpose.

Example 1.

100 parts of glycerol, 100 parts of phenol, and 5 parts of 50% sulphuric acid are placed in a suitable vessel connected to a fractionating column so adjusted that only the low boiling mixture of phenol and water can pass through the head. The charge is brought to ebullition and water of condensation removed as rapidly as it is formed. It will thus be found that a temperature from 380° to 400° F. will be obtained in the charge, whereas the temperature of the still head will be from 210° to 220° F. Within ½ to 1 hour the charge will be converted to a heavy mass solid at room temperatures. It has been found essential in this condensation to remove water as fast as it is formed; otherwise, the reaction is extremely difficult to control and the charge may become infusible and insoluble. It is not essential to employ highly refined glycerol. We have found the cruder glycerols and even the residues obtained from the distillation of glycerol very suitable for our purpose.

Example 2.

Glycerol phenol condensation products may also be obtained by the following method: 100 parts of glycerol, 100 parts of phenol, and 10 parts of 50% sulphuric acid are placed in a suitable pressure resisting container. After heating at 420° to 450° F. for a period of 2 to 4 hours, the charge is converted to a black material of syrupy consistency. The acid may then be neutralized with a suitable base and excess phenol and glycerol removed by distillation. The product obtained is similar to that obtained under Example 1.

It will be noted in the preceding examples that these phenol polyhydric alcohol condensation products may be produced with or without the use of catalysts or condensing agents. Where acid condensing agents are used they may be neutralized in the intermediate product by the use of suitable basic materials, preferably those which will produce relatively insoluble salts having no harmful dielectric effect, as, for example, barium and calcium carbonates.

By varying the ratio of materials employed and the period of cooking, products of a consistency anywhere from liquid to solid at room temperatures may be obtained. All of these are soluble in the ordinary resin solvents such as alcohol, acetone and ether. These low melting or liquid, semi-solid condensation products are particularly well adapted to incorporation with hardening or accelerating agents. On the other hand, the solid, hard, resinous products being soluble may thereby be reduced to the proper consistency for this purpose.

The hardening reactions of the condensation products obtained in the examples may be accelerated by the following procedure: to 100 parts of the liquid or semi-solid condensation product add 7 to 32 parts of a commercial 40% water solution of formaldehyde. It will be found that the formalin and condensation product are miscible. The mixture thus obtained is preferably boiled under a reflux condenser for 2 to 3 hours, whereby most of the formaldehyde is combined with the condensation product without in any way decreasing its solubility. The potentially reactive product thus obtained may be dissolved in any suitable solvent and the resulting solution employed for impregnating laminated sheets of paper or cloth, or may be used for the impregnation of fillers such as wood flour and asbestos. After evaporating the solvents, these products may be formed into desired shapes and rendered infusible by the application of heat or heat and pressure.

To the formaldehyde solution may be added a suitable quantity of ammonia, whereupon hexamethylenetetramin will be formed in situ and will likewise act as a desirable accelerator. It is, however, objectionable in that it liberates free ammonia which may be entrapped in the final reacted product and this increases the moisture absorption and impairs the dielectric strength of the finished article. Therefore, it is desirable to introduce only a minimum amount of ammonia, and during the boiling of the condensation product with formaldehyde and ammonia the formaldehyde will be combined and most of the ammonia will be liberated from the reaction product prior to the molding operation.

Hexamethylenetetramin in aqueous solution may be combined with the liquid condensation products and consequently will not settle out on standing for an indefinite length of time. The presence of water in the condensation product has no detrimental effect upon the water-proofing qualities of these products and does not impair the dielectric strength, particularly where paper, cloth, or fillers are impregnated or incorporated therewith. As a matter of fact, the presence of water, as through the introduction of either aqueous formaldehyde or aqueous hexamethylenetetramin in these condensation products, seems to hasten the drying considerably. From actual experimentation, we find that it takes considerably longer to dry sheets of paper impregnated with anhydrous resins mixed with anhydrous hardening agents in alcohol solution than where substantial quantities of water are present.

On the other hand, where solid, dry, quickly reactive resins are desired, the dry polymers of formaldehyde such as paraform, or the dry form of hexamethylenetetramin or anhydroformaldehydeaniline may be mixed with the substantially anhydrous resin or may be dissolved therewith in any suitable manner.

It is to be understood that where accelerators other than formaldehyde are used, they shall be introduced in proportions equivalent to the proportions of methylene present in the formaldehyde specified.

The following data has been obtained in testing the final infusible products obtained by hardening the polyhydric alcohol phenol condensation products, and illustrates the excellent physical and electrical properties of these materials:

*Pure resins.*

Moisture absorption, per cent gain in weight at room temperature in 100 hrs.—
Purified resin_____ 0.00
Commercial grade resin_____ 0.18
Specific resistance—
Commercial grade resin_____ $4.8 \times 10^{12}$
Per cent power factor—
Commercial grade resin_____ 4.8

*Molding powders.*

Moisture absorption, per cent gain in weight at room temperature 20 min. cook, 2 min. cool—
Polyhydric alcohol condensation product_____ 24 hrs. / 100 hrs.  .27 / 0.59
Tensile strength, lbs./sq. in. ultimate polyhydric alcohol condensation product_____ 5,570

*Laminated composite sheets—White cotton fibre.*

Electrical properties—
Per cent power factor_____ 6.3
Insulation resistance value_____ $1.5 \times 10^{12}$
Dielectric strength—volts/mil_____ 1,400
Mechanical properties—
Tensile strength_____ 12,000
Moisture absorption—12 hrs_____ 0.45%
Moisture absorption—100 hrs_____ 1.5%
Oil absorption—24 hrs_____ .111%
Oil absorption—8 days_____ .115%

Wherein we have used the term phenol, we wish it to include homologues of phenol, substituted phenols, and other bodies having phenolic properties. Wherein we have used the term formaldehyde, we wish it to include hexamethylenetetramin, paraformaldehyde, and other polymers of formaldehyde or methylene engendering bodies. Wherein we have used the term polyhydric alcohol, we wish to include any substance whose molecule contains more than one hydroxyl group possessing alcoholic properties.

What we claim is—

1. The process of producing a resin which consists of boiling together phenol and a polyhydric alcohol and removing the water from the zone of reaction substantially as fast as it is formed.

2. The process of producing a resin which consists of boiling together a phenol and a polyhydric alcohol in the presence of a small amount of sulfuric acid and removing the water from the zone of reaction substantially as fast as it is formed.

3. The process of producing a resin which consists of boiling together a phenol and a polyhydric alcohol in the presence of a small amount of sulfuric acid and removing the water from the zone of reaction by means of a fractionating column substantially as fast as it is formed.

4. The process of producing a resin which consists of boiling together a phenol and glycerol in the presence of a small amount of sulfuric acid and removing the water from the zone of reaction by means of a fractionating column substantially as fast as the water is formed.

5. The process of producing a potentially reactive resin which consists of boiling together a phenol and gylcerol in the presence of a small amount of sulfuric acid and removing the water from the zone of reaction by means of a fractionating column substantially as fast as the water is formed, and combining a methylene body with the resin as a hardening agent therefor.

6. The process of producing a potentially reactive resin which consists of boiling together a phenol and glycerol in the presence of a small amount of sulfuric acid and removing the water from the zone of reaction by means of a fractionary column substantially as fast as the water is formed and combining formaldehyde with the resin as a hardening agent therefor.

7. In the preparation of a phenol polyhydric alcohol resin the step of controlling the reaction by removing the water from the zone of reaction substantially as fast as the water is formed.

8. The step of controlling the reaction between a phenol and a polyhydric alcohol by boiling and removing the water of reaction substantially as fast as it is formed whereby a fusible resinous condensation product of the phenol and polyhydric alcohol is formed.

9. The step of controlling the reaction between a phenol and a polyhydric alcohol which consists of boiling the phenol and polyhydric alcohol in the presence of a small amount of sulfuric acid catalyst and removing the water of reaction by means of a fractionating column substantially as fast as the water is formed.

Signed at Philadelphia, in the county of Philadelphia and State of Pennsylvania, this 13th day of October, A. D. 1923.

EMIL E. NOVOTNY.
CHARLES J. ROMIEUX.